US012024357B2

(12) United States Patent
Brivois

(10) Patent No.: US 12,024,357 B2
(45) Date of Patent: Jul. 2, 2024

(54) CAPSULE INTENDED FOR RECEIVING A SUBSTANCE FOR PREPARING A BEVERAGE

(71) Applicant: BRAIN CORP SA, Schifflange (LU)

(72) Inventor: Olivier Brivois, Paris (FR)

(73) Assignee: Brain Corp SA, Schifflange (LU)

( * ) Notice: Subject to any disclaimer, the term of this patent is extended or adjusted under 35 U.S.C. 154(b) by 804 days.

(21) Appl. No.: 17/041,026

(22) PCT Filed: Mar. 26, 2019

(86) PCT No.: PCT/EP2019/057608
§ 371 (c)(1),
(2) Date: Sep. 24, 2020

(87) PCT Pub. No.: WO2019/185637
PCT Pub. Date: Oct. 3, 2019

(65) Prior Publication Data
US 2021/0024283 A1    Jan. 28, 2021

(30) Foreign Application Priority Data
Mar. 26, 2018   (LU) ........................................ 100748

(51) Int. Cl.
*B65D 85/804*   (2006.01)
*B65D 65/46*    (2006.01)

(52) U.S. Cl.
CPC ....... *B65D 85/8043* (2013.01); *B65D 65/466* (2013.01); *B65D 85/8046* (2013.01); *B32B 2307/412* (2013.01)

(58) Field of Classification Search
CPC ............ B65D 85/8046; B65D 85/8043; B65D 65/466; A47J 31/407; A47J 31/369; A47J 31/3676; A47J 31/3623
See application file for complete search history.

(56) References Cited

U.S. PATENT DOCUMENTS

| | | | |
|---|---|---|---|
| 2012/0097602 A1* | 4/2012 | Tedford | B65D 65/466 |
| | | | 210/500.1 |
| 2017/0107034 A1* | 4/2017 | Okamoto | B65D 3/04 |
| 2017/0144813 A1* | 5/2017 | Thibado | B29C 48/21 |
| 2019/0225412 A1* | 7/2019 | Cabilli | B65D 85/8043 |

FOREIGN PATENT DOCUMENTS

| | | |
|---|---|---|
| EP | 2966006 A1 | 1/2016 |
| JP | H05199938 A | 8/1993 |
| WO | 2013029184 A1 | 3/2013 |
| WO | 2015082982 A1 | 6/2015 |
| WO | 2017025622 A1 | 2/2017 |

OTHER PUBLICATIONS

International Search Report issued in corresponding application No. PCT/EP2019/057608, dated Apr. 23, 2019.

* cited by examiner

*Primary Examiner* — Reginald Alexander
(74) *Attorney, Agent, or Firm* — Murtha Cullina, LLP

(57) ABSTRACT

The invention is a capsule intended for receiving a substance for preparing a beverage. The capsule has a body made from a compostable material according to standard EN 13432, and is equipped with at least one sealing film having at least one layer made from compostable material and at least one sealing layer on the body. The sealing film has an oxygen transmission rate of not more than 5 cm3/m2·day·atm according to standard ASTM F1927.

15 Claims, 5 Drawing Sheets

CAPSULE INTENDED FOR RECEIVING A SUBSTANCE FOR PREPARING A BEVERAGE

CROSS-REFERENCE TO RELATED APPLICATIONS

This application claims the benefit of International application number PCT/EP2019/057608, filed Mar. 26, 2019 and Luxembourg patent application number 100748, filed on Mar. 26, 2018, the entire contents of which are incorporated herein by reference.

TECHNICAL FIELD

The invention relates to a capsule intended for receiving a substance for preparing a beverage.

Capsules are known with a body which can be manufactured by moulding, in particular by injecting a plastic material into a mould provided for this purpose. The body has a base and a lateral wall, as well as an edge surrounding an upper opening and designed to be covered by a lid after filling the capsule with the substance through the upper opening.

Such capsules are designed in particular for preparing a hot beverage such as coffee, tea or an infusion. To achieve this a capsule is installed into the housing of a machine provided for this purpose, where it is held by a piston during the passage of an extracting liquid, for example hot water, through it and the substance that it contains, after piercing its base with the spikes of the piston.

To preserve the organoleptic properties of the substance, it is necessary to conserve it in a capsule with good oxygen and moisture to air barrier properties.

To achieve this, impermeable plastic materials are known, in particular impermeable to gas, but the latter are not adapted to the manufacture of a capsule, insofar as they prove to be difficult to inject and are also relatively expensive. Furthermore, the plastic materials are not generally recyclable, which is problematic with regard to the processing of waste.

Capsules are also known, in which the body is made from a compostable and/or biodegradable plastic material. However, such a body generally has high porosity.

SUMMARY OF THE INVENTION

The invention intends to improve the prior art by proposing a capsule which is arranged to have good sealing properties, in particular to air, while being easily compostable, for industrial and domestic purposes.

For this purpose, the invention proposes a capsule intended for receiving a substance for preparing a beverage, the capsule comprising a body made from compostable material according to standard EN 13432, and being provided with at least one sealing film having at least one layer of compostable material and at least one sealing layer on the body, the sealing film having an oxygen transmission rate of at most 5 $cm^3/m^2 \cdot day \cdot atm$ according to standard ASTM F1927.

BRIEF DESCRIPTION OF THE DRAWINGS

Other features and advantages of the invention are given in the following description, made with reference to the accompanying figures, wherein.

DETAILED DESCRIPTION

With respect to these figures, a capsule designed to receive a substance for preparing a beverage is described below.

Figure 6A:
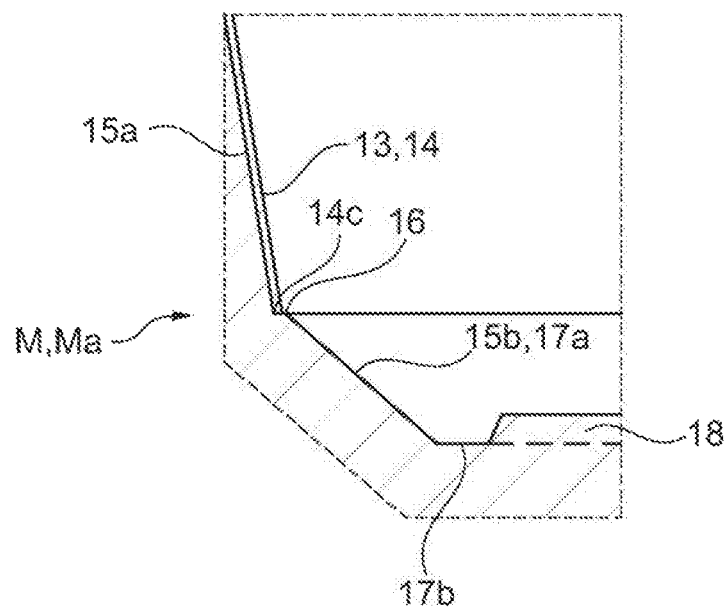
FIGS. 6a, 6b and 6c each represent schematically a partial longitudinal cross-section of a manufacturing stage of a capsule according to the invention.
Figure 6B:
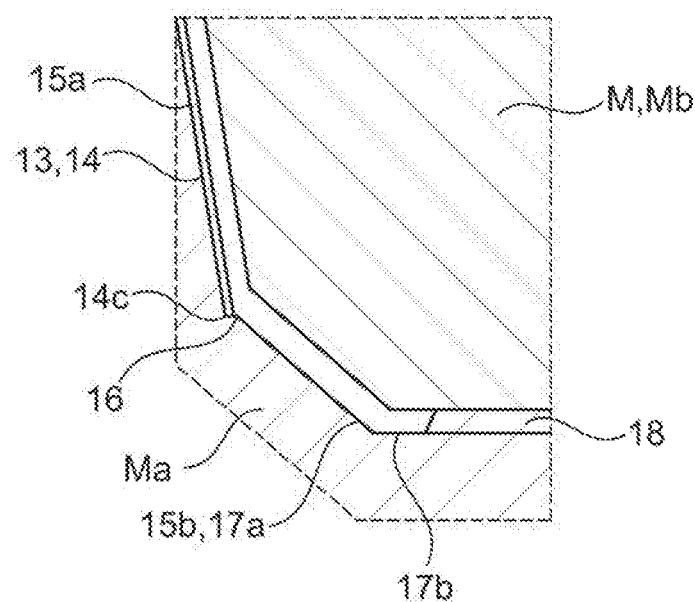

The capsule comprises a body 1 which can be manufactured by moulding, in particular by injecting a plastic material into a mould M as represented in FIGS. 6a and 6b. The body 1 has a base 2 and a lateral wall 3, as well as an edge 4 surrounding an upper opening 5 and designed to be covered by an upper lid after filling the capsule with the substance through the upper opening.

In particular, the capsule is designed for preparing a hot beverage such as coffee, tea or an infusion. To achieve this, the capsule can be installed into the housing of a machine provided for this purpose, to be held there by a piston equipped with spikes for piercing the base 2 of the capsule. Furthermore, at least one spike passes through the upper lid for injecting an extracting liquid, in particular hot water, through the capsule and the substance that it contains, in order to complete the preparation of the beverage.

Figure 1A:
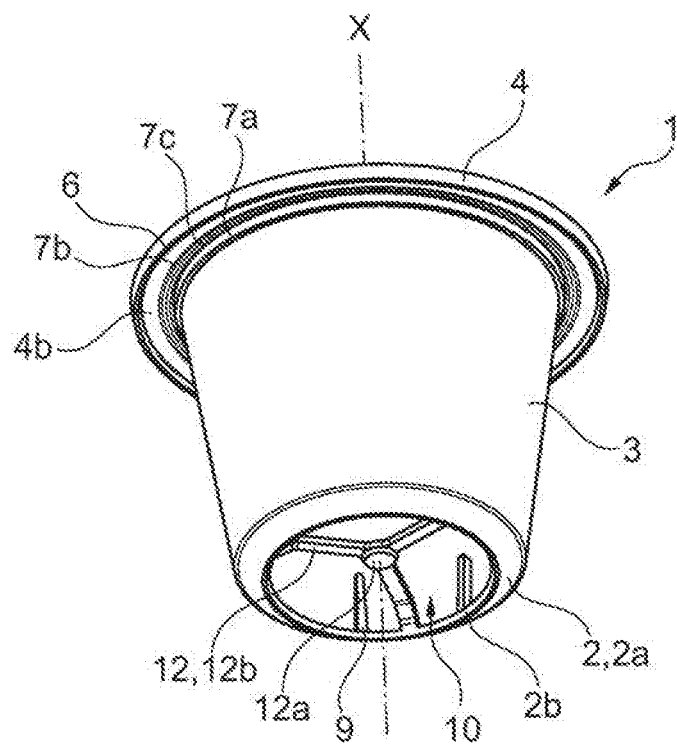
FIGS. 1a and 1b represent schematically a perspective view of the body of a capsule according to the invention, respectively in a view from below (FIG. 1a) and in a view from above (FIG. 1b)
Figure 1B:
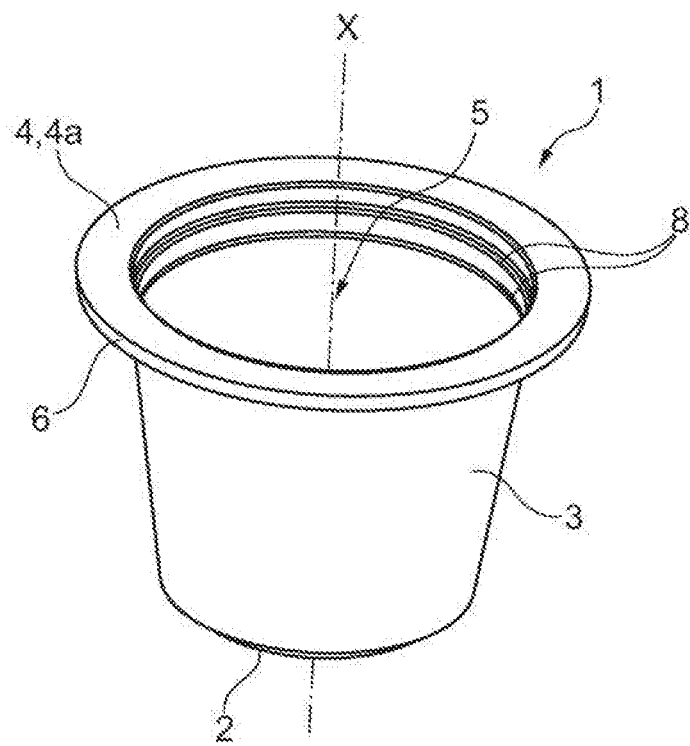
Figure 5:
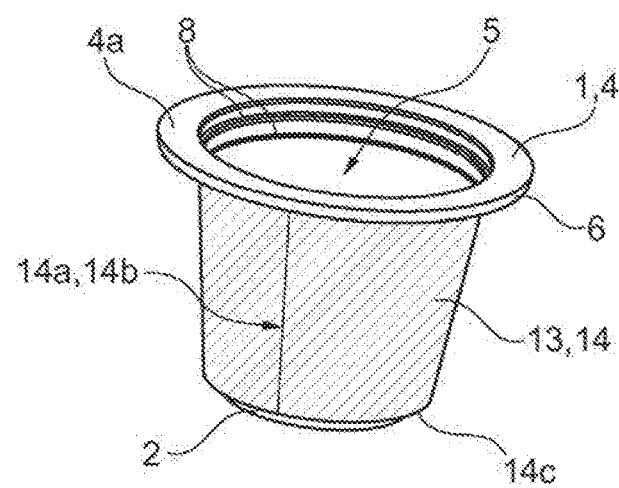
FIG. 5 represents schematically a perspective view from above of a capsule according to the invention comprising the body of FIGS. 1a and 1b and the side label of FIG. 4.

The body 1 presents a geometry of revolution around a central axis X. In FIGS. 1a, 1b and 5, the body 1 has in particular a lateral wall 3 which is globally curved into a truncated cone with a straight generatrix between the base 2 and the upper edge 4.

The upper edge 4 has a smooth upper wall 4a on which an upper lid is designed to be fixed, in particular by means of an adhesive, in order to block the upper opening 5 after filling it with the substance for preparing a beverage.

The upper edge 4 also has a lower wall 5b, the free outer edge of which is bordered by a stiffening rim 6, and the inner portion of which, which is joined to the upper edge of the lateral wall 3, comprises inner 7a and outer 7b rims with substantially triangular cross-sections, between which a sealing lip 7c extends, also having a triangular cross-section. Such a structure is described in more detail in document EP-2 966 006.

When arranging the capsule in the housing of a machine, the peripheral edge of the piston (not shown) is positioned between the outer 7b and inner 7a rims by crushing the sealing lip 7c, the piston—rims 7a, 7b—lip 7c assembly, forming a sealing baffle for limiting leaks during the injection of the extracting liquid into the capsule.

Figure 2A:
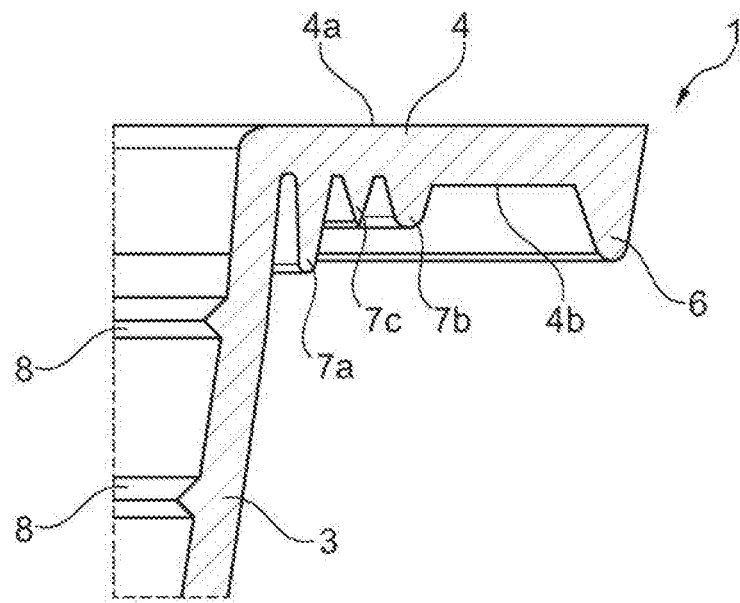
FIGS. 2a and 2b represent schematically a partial longitudinal cross-section of the capsule body in FIGS. 1a and 1b, with an enlargement respectively of the upper part (FIG. 2a) and the lower part (FIG. 2b) of the body.

With regard to FIGS. 1b and 2a, the lateral wall 3 comprises circular inner ribs 8 formed in the proximity of the upper opening 5, the ribs being arranged to enable the extraction of the capsule from its manufacturing mould M.

Figure 2B:
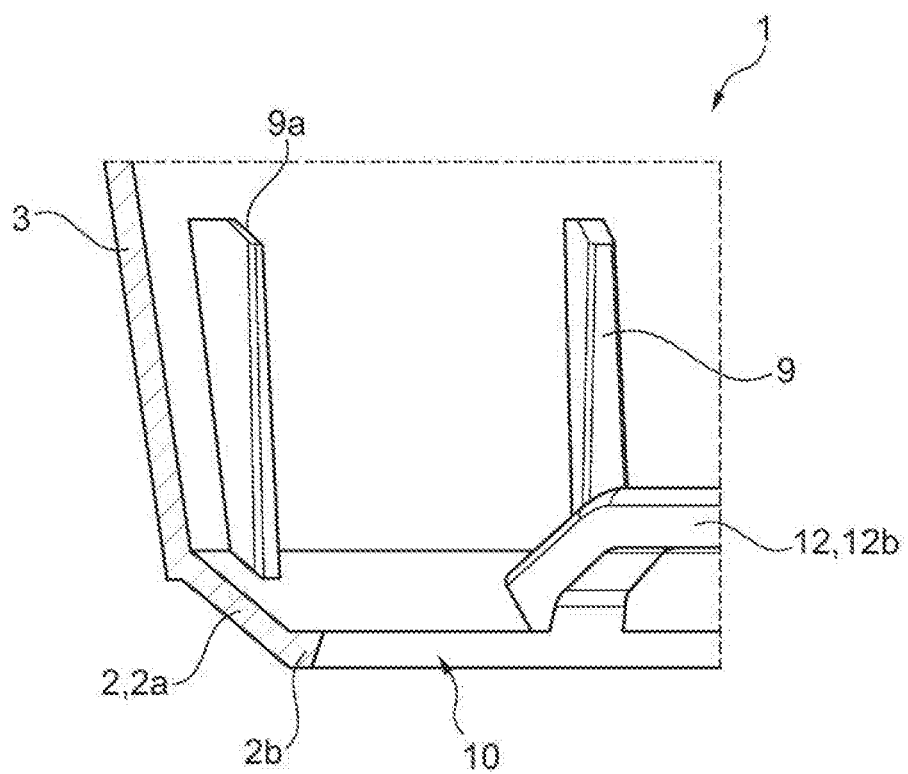

Furthermore, as shown in FIGS. 1*a* and 2*b*, the lateral wall 3 comprises inner mounts 9 formed in the proximity of the base 2 and distributed at equal angles, each mount 9 being provided with an upper bearing surface 9*a* designed to receive the base of an inserted capsule. Thus, the capsules can be packaged in batches by nesting them into one another after their manufacture, so that they can be supplied to producers for their subsequent filling with a substance for preparing a beverage.

In the embodiment represented, the base 2 comprises a central opening 10 designed to be covered by a lower lid 11 to form the capsule, the lower lid being designed to be pierced by the spikes of the piston during the preparation of a beverage. In particular, the base 2 comprises an upper rim 2*a* joined to the lower edge of the truncated cone-shaped lateral wall 3, as well as a lower rim 2*b* surrounding the central opening 10.

The base 2 also comprises a spider 12 which has a central hub 12*a* joined to the upper rim 2*a* by three branches 12*b*. The branches 12*b* are curved upwards in such a way as to enter the inner volume of the capsule and are spaced apart from the base 2 by a distance sufficient to avoid any contact with the spikes of the piston during the use of the capsule to prepare a beverage. Furthermore, the mounts 9 are arranged so that their respective bearing surfaces 9*a* extend above the spider 12, in order to avoid contact between the spider and the base of an inserted capsule, and thus prevent damage by the spider of the lower lid covering the base.

As explained in document WO-2017/025622, the spider 12 is used for injecting plastic material into the mould M for the manufacture of the body 1. More precisely, the central hub 12*a* corresponds to the entry point of the plastic material injected into the mould M, whereas the branches 12*b* enable the distribution of the plastic material consecutively towards the upper rim 2*a*, the truncated cone-shaped lateral wall 3 and the upper edge 4.

In an advantageous manner, the branches 12*b* are distributed at equal angles around the central hub 12*a* and each have a cross-section with dimensions adapted to facilitate the passage of the plastic material under pressure to the parts most remote from the injection point.

In order to facilitate the processing of waste containing the capsules, the body 1 is made from a compostable material according to standard EN 13432.

In particular, the material forming the body 1 is selected to allow industrial as well as domestic composting, and can be biodegradable. In an advantageous manner, the body 1 is formed by the injection of a plastic material based on polylactic acid (PLA), in that this material as well as being compostable and compatible with food substances, makes it possible to easily form thin-walled capsules by injection, and does not deform under the effect of heat.

To preserve the qualities, in particular the organoleptic qualities, of the substance used for the preparing a beverage, it is necessary to package it in a capsule protected from oxygen and moisture in the air.

To achieve this, the capsule is equipped with at least one sealing film 13 having at least one layer 13*a* made of a compostable material according to standard EN 13432, which can be biodegradable, and at least one layer 13*b* for sealing on the body 1, the sealing film having an oxygen transmission rate (OTA) of at most 5 $cm^3/m^2 \cdot day \cdot atm$ according to standard ASTM F1927.

Thus, the capsule offers a good compromise between the sealing necessary for the good preservation of the substance that it contains, and the composting properties which make it possible to facilitate the processing of the waste that it generates.

In an advantageous manner, the sealing film 13 is entirely compostable and may be biodegradable. Furthermore, the sealing film 13 has an oxygen transmission rate of about 1 $cm^3/m^2 \cdot day \cdot atm$ according to standard ASTM F1927.

The sealing film 13 can also have at least one of the following features:
- a thickness between 15 μm and 100 μm, in particular between 20 μm and 30 μm;
- a grammage between 20 $g/m^2$ and 50 $g/m^2$, in particular between 29 $g/m^2$ and 43 $g/m^2$;
- a permeability to water vapour in the order of 10 $g/m^2 \cdot 24$ h, measured in particular according to the standard ASTM E96.

The compostable layer 13*a* can be made from a transparent material, in particular based on cellulose fibres, and/or based on polylactic acid (PLA).

The sealing layer 13*b* can have moisture barrier properties and/or can be made of polylactic acid (PLA). Furthermore, the sealing layer 13*b* can be adapted to hot and/or cold sealing.

Figure 3:
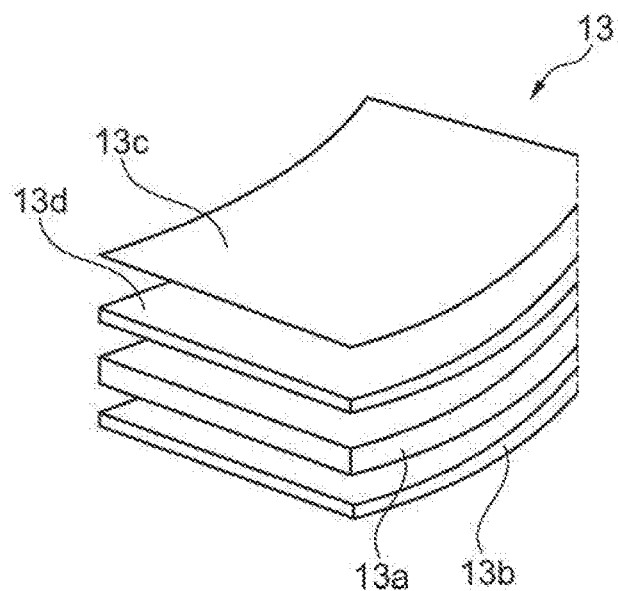
FIG. 3 represents schematically an exploded perspective view of a sealing film of a capsule according to the invention.

With regard to FIG. 3, the sealing film 13 also has an outer layer 13*c* which has oxygen and/or moisture barrier properties. The outer layer 13*c* can be metallised, in particular with aluminium and/or aluminium oxide (AlOx).

The sealing film 13 can also have an external layer 13*d* which has moisture barrier properties, in particular based on polylactic acid (PLA). In particular, as shown in FIG. 3, such a moisture barrier layer 13*d* can be applied to the outer face of the compostable layer 13*a*, in particular interposed between the compostable layer and the metallised oxygen and/or moisture barrier layer 13*c*.

For aesthetic and/or commercial reasons, the sealing film 13 can also have an additional layer provided with an imprint which is formed by ink deposition on one of its faces, the imprint comprising for example text information and/or a decorative element, such as for example a logo, a trade mark and/or a description of the substance contained in the capsule. Such a layer can be applied in particular onto the outer face of the metallic layer 13*c* represented in FIG. 3.

In particular, the printing layer can be made from a transparent material, in particular based on cellulose fibres, the ink of the imprint being disposed on its inner face. Furthermore, to improve the aesthetic qualities of the capsule, the printing layer can have shiny or antistatic properties.

In order to form the sealing film 13, the aforementioned different layers 13*a*, 13*b*, 13*c*, 13*d* can be assembled by means of a biodegradable adhesive, for example based on maize starch, in order to facilitate elimination by composting the waste generated by the capsule.

Figure 4:
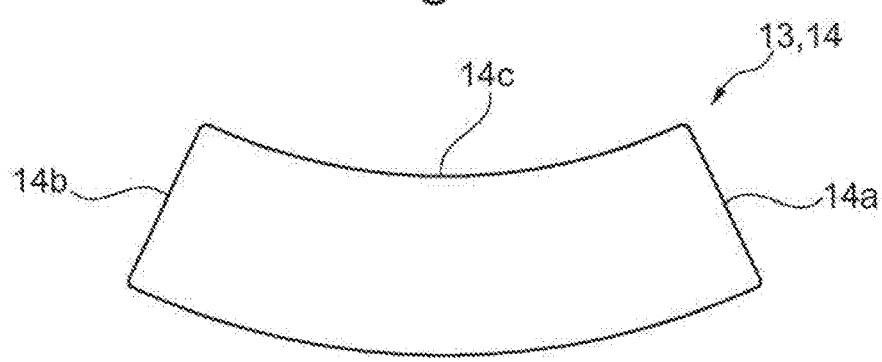
FIG. 4 represents a schematic front view of a side label formed from the sealing film in FIG. 3.

A sealing film 13 can cover the lateral wall 3. To achieve this, as represented in FIGS. 4 and 5, the sealing film 13 is used to form a label 14 in the shape of a circular ring sector, the dimensions of which correspond exactly to those of the lateral truncated cone-shaped wall 3. Thus, as represented in FIG. 5, the lateral edges 14*a*, 14*b* of the label 4 join together exactly on a generatrix of the lateral wall 3, which makes it possible to avoid the formation of an unattractive and permeable gap between the edges.

The side label 14 can be in particular attached to the body 1 during the injection moulding of the body, according to the IML process (In-Mould Labelling). To achieve this, as represented in FIGS. 6*a* and 6*b*, the mould M comprises a female part Ma and a male part Mb delimiting between them a cavity for the formation of the body 1, the parts each having functional surfaces with a geometry respectively complementary to the exterior and interior of the body.

The female part Ma has an upper portion 15a with a geometry complementary to that of the lateral wall 3 and a lower portion 15b with a geometry complementary to that of the base 2, the side label 14 being arranged against the upper portion 15a before the positioning of the male part Mb and the injection of the plastic material forming the body 1, in order to permit the integration of the label onto the body. In particular, the female part Ma has a radial annular shoulder 16 formed at the junction between its lower portion 15b and upper portion 15a, the lower edge 14c of the label 14 abutting against the shoulder during the positioning of the label.

Figure 6C:
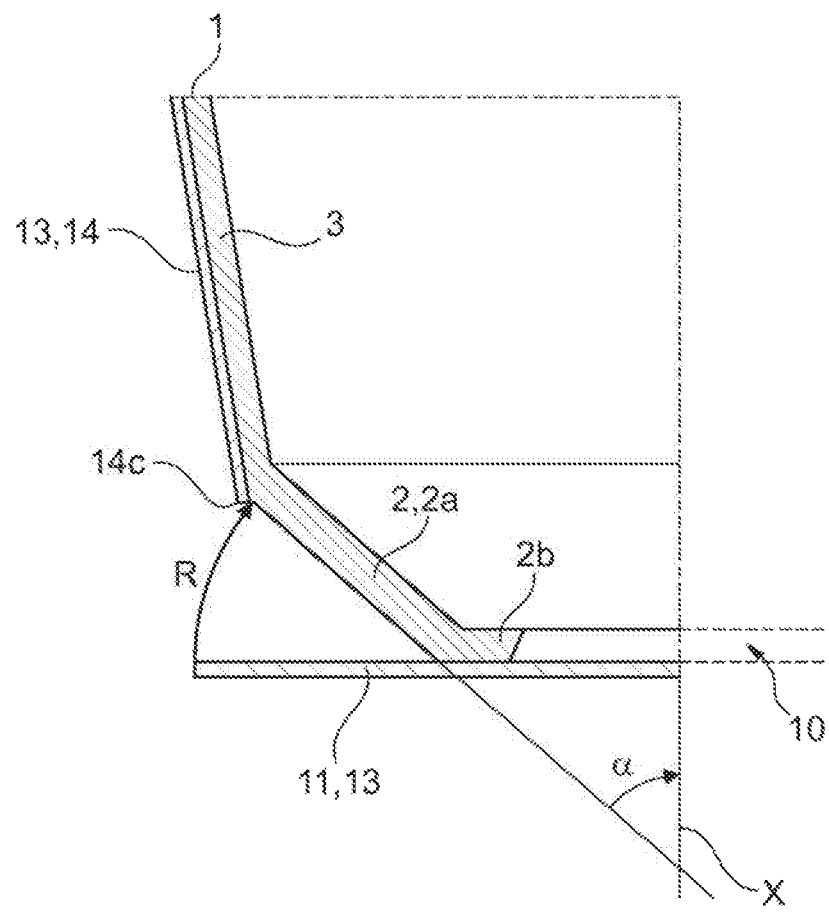

In an advantageous manner, a sealing film 13 can also be used to form the lower lid 11. In particular, due to the presence of the spider 12, the lower lid 11 can be connected to the exterior of the base 2, in particular by adhesion after the injection of the body 1, as represented in FIG. 6c, or during the injection following the IML process, as for the side label 14. In one variant, the lower lid 11 can be connected to the interior of the base 2, in particular according to the aforementioned IML process.

In an advantageous manner, the upper rim 2a of the base 2 has the geometry of a truncated cone, in particular with a cone angle α between 45° and 55°, which joins the lower edge of the truncated-cone shaped lateral wall 3 by its large base. Furthermore, the lower rim 2b of the base 2 is associated with the small base of the upper truncated-cone-shaped rim 2a and has a plane annular form surrounding the central opening 10.

Thus, the upper rim 2a forms a regular surface enabling a good coverage of the assembly of the base 2 by the lower lid 11. In particular, the lower lid 11 can be dimensioned in a very precise manner to be able to cover the base 2 exactly up to its junction with the lateral wall 3, which makes it possible to avoid any overshooting of the lid which could affect the seal of the capsule and/or the good insertion of the capsule into the housing of a machine for preparing beverages.

Furthermore, a perfectly dimensioned lower lid 11 can cover the base 2 in a taut manner with a minimum size in addition, which permits a regular and effective piercing of the lid by the piston spikes, in order to guarantee a regular distribution of the extracting liquid throughout the whole mass of the substance contained in the capsule.

In addition, the fixing of the lower lid 11 onto the truncated cone-shaped upper rim 2a guarantees the hold of the lid above the central opening 10, which prevents the detachment of the lid during the piercing.

In order to be able to form a base 2 with such features, the lower portion 15b of the female part Ma has a truncated cone-shaped upper surface 17a and a lower annular surface 17b extending radially from the lower edge of the truncated cone-shaped surface. Furthermore, the female part Ma comprises a circular protrusion 18 extending to the centre of the lower surface 17b to delimit the central opening 10 during the moulding of the body 1.

In order to associate the lower lid 11 to the base 2, the lid is firstly secured, in particular by means of its sealing layer 13b, onto the lower face of the lower rim 2b, to hide the central opening 10. Then, the periphery of the lower lid 11 is folded along to the arrow R onto the truncated cone-shaped upper rim 2a up to the junction with the lateral wall 3, that is up to the level of the lower edge 14c of the side label 14.

Once the capsule is filled with the substance, the upper opening 5 is hidden by positioning, in particular by adhesion, an upper lid onto the upper wall 4a of the edge 4.

In particular, the upper lid is arranged to resist pressure during the extraction, in order to allow the establishment of a specific pressure in the capsule during the injection of the extractor liquid.

In an advantageous manner, the upper lid can also be formed from the aforementioned sealing film 13, in order to improve the preservation of the substance in the capsule and to facilitate the processing of waste generated by the capsule.

What is claimed is:

1. A capsule designed to receive a substance for preparing a beverage, the capsule comprising a body made of compostable material according to standard EN 13432, and it is equipped with at least one sealing film having at least one layer made of compostable material and at least one sealing layer on the body, the sealing film having an oxygen transmission rate of not more than 5 $cm^3/m^2 \cdot day \cdot atm$ according to standard ASTM F1927, the body having a base and a lateral wall which globally curves into a truncated cone, and an edge configured to be covered by a lid after filling the capsule with the substance, wherein the sealing film covers said lateral wall.

2. The capsule according to claim 1, wherein the sealing film has a thickness between 15 μm and 100 μm.

3. The capsule according to claim 1, wherein the sealing film has an oxygen transmission rate of about 1 $cm^3/m^2 \cdot day \cdot atm$ according to standard ASTM F1927.

4. The capsule according to claim 1, wherein the sealing film is compostable.

5. The capsule according to claim 1, wherein the compostable layer is made from a transparent material.

6. The capsule according to claim 1, wherein the compostable layer is made from cellulose fibres.

7. The capsule according to claim 1, wherein the sealing layer has moisture barrier properties.

8. The capsule according to claim 1, wherein the compostable layer or the sealing layer is based on polylactic acid (PLA).

9. The capsule according to claim 1, wherein the sealing film comprises an external layer having moisture barrier properties.

10. The capsule according to claim 1, wherein the sealing film has an outer layer having oxygen or moisture barrier properties.

11. The capsule according to claim 10, wherein the outer layer of oxygen barrier or moisture barrier is a metallised layer, made with aluminium or aluminium oxide.

12. The capsule according to claim 1, wherein the sealing film comprises a layer which presents an imprint formed by ink deposition onto one of its faces.

13. The capsule according to claim 12, wherein the printing layer is made from a transparent material, based on cellulose fibres, the printing ink being deposited on its inner face.

14. The capsule according to claim 1, wherein the base is provided with a central opening, and the sealing film covering the central opening.

15. The capsule according to claim 1, wherein the lid is formed by the sealing film.

\* \* \* \* \*